US010622021B2

(12) United States Patent
Buyuklu et al.

(10) Patent No.: US 10,622,021 B2
(45) Date of Patent: Apr. 14, 2020

(54) METHOD AND SYSTEM FOR VIDEO EDITING

(71) Applicant: AVCR Bilgi Teknolojileri A.S., Maslak Istanbul (TR)

(72) Inventors: Ugur Buyuklu, Ümraniye Istanbul (TR); Kemal Ugur, Maslak Istanbul (TR); Oguz Bici, Sirinyer Buca (TR)

(73) Assignee: AVCR BILGI TEKNOLOJILERI A.S, Maslak, Istanbul (TR)

( * ) Notice: Subject to any disclaimer, the term of this patent is extended or adjusted under 35 U.S.C. 154(b) by 0 days.

(21) Appl. No.: 15/435,687

(22) Filed: Feb. 17, 2017

(65) Prior Publication Data

US 2017/0243611 A1   Aug. 24, 2017

Related U.S. Application Data

(60) Provisional application No. 62/297,218, filed on Feb. 19, 2016, provisional application No. 62/362,727, filed on Jul. 15, 2016.

(51) Int. Cl.
*G11B 27/036* (2006.01)
*G11B 27/34* (2006.01)
*H04N 5/262* (2006.01)

(52) U.S. Cl.
CPC ............ *G11B 27/036* (2013.01); *G11B 27/34* (2013.01); *H04N 5/2621* (2013.01)

(58) Field of Classification Search
CPC ..... G11B 27/036; G11B 27/34; G11B 27/034; H04N 5/23293; H04N 5/2621
See application file for complete search history.

(56) References Cited

U.S. PATENT DOCUMENTS

| 5,467,288 A | * | 11/1995 | Fasciano | G06T 17/00 715/202 |
| 5,781,188 A | * | 7/1998 | Amiot | G11B 19/022 715/202 |
| 5,966,122 A | * | 10/1999 | Itoh | G06F 3/04845 348/239 |
| 6,404,978 B1 | * | 6/2002 | Abe | G11B 27/034 386/230 |
| 6,477,315 B1 | * | 11/2002 | Ohomori | G11B 27/034 345/629 |
| 6,546,188 B1 | * | 4/2003 | Ishii | G11B 27/031 386/280 |
| 7,020,381 B1 | * | 3/2006 | Kato | G11B 27/034 345/629 |

(Continued)

*Primary Examiner* — David E Harvey
(74) *Attorney, Agent, or Firm* — Ziegler IP Law Group, LLC

(57) ABSTRACT

Disclosed is a method for video editing. The method comprises selecting at least one video, using a user interface, displaying one of the selected at least one video, on a video preview area on the user interface, providing at least one effect button on the user interface, to be activated by applying a pointing device at the at least one effect button, wherein each of the at least one effect button is associated with one video editing effect, selecting a time point in a timeline of the displayed one video, activating an effect button selected from the at least one effect button provided, and applying a video editing effect corresponding to the activated effect button from the selected time point forward until detecting de-activation of the activated effect button.

18 Claims, 13 Drawing Sheets

(56) References Cited

U.S. PATENT DOCUMENTS

| | | | | |
|---|---|---|---|---|
| 7,024,677 B1* | 4/2006 | Snyder | G11B 27/031 | 715/723 |
| 8,837,912 B2* | 9/2014 | Tanuma | G11B 27/007 | 386/278 |
| 9,240,215 B2* | 1/2016 | Eppolito | G11B 27/034 | |
| 2001/0020953 A1* | 9/2001 | Moriwake | G11B 27/034 | 715/723 |
| 2002/0152313 A1* | 10/2002 | Nishimura | G06F 9/5027 | 709/227 |
| 2002/0184630 A1* | 12/2002 | Nishizawa | G06F 1/1616 | 725/44 |
| 2003/0033161 A1* | 2/2003 | Walker | G06Q 10/10 | 705/1.1 |
| 2003/0079008 A1* | 4/2003 | Fujii | H04L 29/06027 | 709/223 |
| 2004/0260669 A1* | 12/2004 | Fernandez | G06F 17/30017 | |
| 2005/0025320 A1* | 2/2005 | Barry | G11B 27/034 | 381/119 |
| 2006/0059426 A1* | 3/2006 | Ogikubo | G11B 27/034 | 715/723 |
| 2006/0195786 A1* | 8/2006 | Stoen | H04L 51/04 | 715/700 |
| 2006/0214935 A1* | 9/2006 | Boyd | G06F 9/4488 | 345/473 |
| 2006/0242550 A1* | 10/2006 | Rahman | H04N 21/4825 | 715/203 |
| 2006/0263037 A1* | 11/2006 | Gilley | G06Q 30/02 | 386/232 |
| 2007/0022080 A1* | 1/2007 | Broeksteeg | G11B 27/105 | |
| 2007/0263979 A1* | 11/2007 | Kihara | G11B 27/034 | 386/242 |
| 2007/0296734 A1* | 12/2007 | Ekpar | G06T 1/00 | 345/619 |
| 2008/0187279 A1* | 8/2008 | Gilley | G06Q 30/02 | 386/250 |
| 2008/0247726 A1* | 10/2008 | Lee | G11B 27/036 | 386/282 |
| 2009/0162024 A1* | 6/2009 | Bradicich | H04N 9/8205 | 386/241 |
| 2010/0281377 A1* | 11/2010 | Meaney | G11B 27/034 | 715/723 |
| 2010/0319045 A1* | 12/2010 | Lee | G11B 27/034 | 725/118 |
| 2011/0116769 A1* | 5/2011 | Sugiyama | G06F 3/0481 | 386/282 |
| 2011/0276881 A1* | 11/2011 | Keng | G11B 27/034 | 715/723 |
| 2012/0311445 A1* | 12/2012 | Cabanilla | G11B 27/3027 | 715/716 |
| 2013/0073964 A1* | 3/2013 | Meaney | G11B 27/031 | 715/716 |
| 2013/0083211 A1* | 4/2013 | Kunishige | H04N 5/23245 | 348/220.1 |
| 2013/0097644 A1* | 4/2013 | Brande | H04N 21/6408 | 725/93 |
| 2014/0111534 A1* | 4/2014 | Niles | G06T 15/60 | 345/589 |
| 2014/0123041 A1* | 5/2014 | Morse | G11B 27/031 | 715/765 |
| 2014/0237365 A1* | 8/2014 | Oberbrunner | G11B 27/34 | 715/722 |
| 2014/0355789 A1* | 12/2014 | Bohrarper | H04R 3/00 | 381/119 |
| 2015/0155008 A1* | 6/2015 | Herberger | G11B 27/034 | 386/224 |
| 2015/0220249 A1* | 8/2015 | Snibbe | G06F 3/0412 | 715/719 |
| 2015/0339010 A1* | 11/2015 | Pamuru | G06F 3/0482 | 715/726 |
| 2016/0283097 A1* | 9/2016 | Voss | H04N 21/4312 | |
| 2017/0024110 A1* | 1/2017 | Xu | G06F 3/04817 | |
| 2017/0078566 A1* | 3/2017 | Ota | H04N 5/23229 | |
| 2017/0243611 A1* | 8/2017 | Buyuklu | G11B 27/34 | |
| 2017/0352379 A1* | 12/2017 | Oh | G11B 27/034 | |
| 2018/0366161 A1* | 12/2018 | Gilley | G06Q 30/0277 | |

\* cited by examiner

METHOD AND SYSTEM FOR VIDEO EDITING

TECHNICAL FIELD

The present disclosure relates generally to editing digital media; and more specifically, to a method and a system for video editing.

BACKGROUND

In recent years, there has been an increase in the use of mobile devices (such as smartphones) by people. Usually, the mobile devices are equipped with hardware such as camera, microphone, and so forth that enable people (such as users of the mobile devices) to perform various tasks associated with digital media such as capturing images, recording audio, recording videos, and so forth. Further, a user of a mobile device (or a user device) often shares such recorded content, such as captured images, recorded audio and/or videos associated with a celebration, a vacation experience, a public conference and so forth, with other users. However, such recorded content may need to be edited before it can be shared with other users.

Conventionally, Personal Computer based editing tools allow the user to perform editing of videos. It may be appreciated that the user may be required to be in possession of a computer (such as a personal computer), associated hardware (such as keyboard, mouse and so forth) and software (such as specialized video editing software) to perform such editing. For example, the user may be required to transfer the videos from the mobile user device to the computer and perform editing thereon, which may be cumbersome. Often, the existing video editing tools do not include provisions to preview editing effects prior to implementation on the videos.

Nowadays, video editing tools are being developed to enable users to edit video content on-the-go. However, such tools are not sufficiently well developed and generally provide only a limited number of functions. For example, existing video editing tools do not enable the users to make collaborative videos, such as by synchronization of two different videos by the same user or of videos by two different users. Therefore, advanced editing functions such as customization of timing and/or duration of individual videos in the collaborative video, adding effects to the collaborative video and so forth are not supported by presently available video editing tools.

Therefore, in light of the foregoing discussion, there exists a need to overcome the aforementioned drawbacks associated with video editing.

SUMMARY

The present disclosure seeks to provide a method for video editing. The present disclosure also seeks to provide a system for video editing. The present disclosure seeks to provide a solution to the existing problems associated with limited number of features and equipment for video editing. An aim of the present disclosure is to provide a solution that overcomes at least partially the problems encountered in prior art, and provides an efficient, multifunctional, and easy-to-use method and system for video editing.

In one aspect, an embodiment of the present disclosure provides a method for video editing, the method comprising:
  selecting at least one video, using a user interface;
  displaying one of the selected at least one video, on a video preview area on the user interface;
  providing at least one effect button on the user interface, to be activated by applying a pointing device at the at least one effect button, wherein each of the at least one effect button is associated with one video editing effect;
  activating an effect button selected from the at least one effect button provided; and
  applying a video editing effect corresponding to the activated effect button from the selected time point forward until detecting de-activation of the activated effect button.

In another aspect, an embodiment of the present disclosure provides a system for video editing, the system comprising:
  a user interface rendered on a user device associated with a user, the user interface comprising at least one effect button, a video preview area, and a timeline;
  an Input/Output module configured to:
    receive selection of at least one video;
    display one of the selected at least one video, on the video preview area on the user interface;
    provide the at least one effect button on the user interface, to be activated by applying a pointing device at the at least one effect button; and
    receive activation of an effect button of the at least one effect button, wherein each of the at least one effect button comprises an associated at least one video editing effect; and
  a processing unit configured to apply a video editing effect corresponding to the activated effect button from the time point forward until detection of de-activation of the activated effect button.

Embodiments of the present disclosure substantially eliminate or at least partially address the aforementioned problems in the prior art, and enables user-friendly and efficient video editing.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
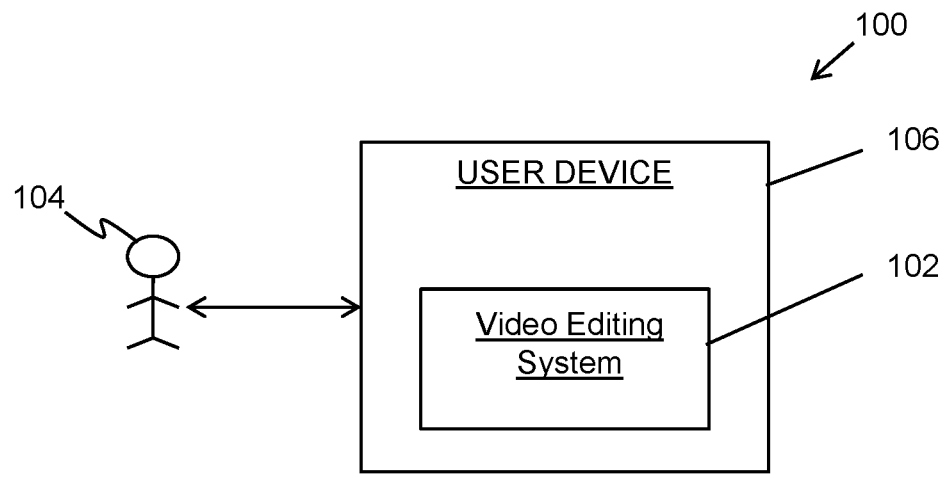
FIGS. 1-2 are illustrations of environments for using a system for video editing, in accordance with different embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a method for video editing, the method comprising:
 selecting at least one video, using a user interface;
 displaying one of the selected at least one video, on a video preview area on the user interface;
 providing at least one effect button on the user interface, to be activated by applying a pointing device at the at least one effect button, wherein each of the at least one effect button is associated with one video editing effect;
 activating an effect button selected from the at least one effect button provided; and
 applying a video editing effect corresponding to the activated effect button from the selected time point forward until detecting de-activation of the activated effect button.

In another aspect, an embodiment of the present disclosure provides a system for video editing, the system comprising:
 a user interface rendered on a user device associated with a user, the user interface comprising at least one effect button, a video preview area, and a timeline;
 an Input/Output module configured to:
  receive selection of at least one video;
  display one of the selected at least one video, on the video preview area on the user interface;
  provide the at least one effect button on the user interface, to be activated by applying a pointing device at the at least one effect button; and
  receive activation of an effect button of the at least one effect button, wherein each of the at least one effect button comprises an associated at least one video editing effect; and
 a processing unit configured to apply a video editing effect corresponding to the activated effect button from the time point forward until detection of de-activation of the activated effect button.

The present disclosure provides a method and a system for video editing. The method enables a user to apply a video editing effect by simply activating an effect button and is therefore, user-friendly. Further, since the described system includes a varied range of video editing effects, the user enjoys a large selection of available choices to be applied using the at least one effect button on the user interface. The method may also comprise as an optional step selecting a time point in a timeline of the displayed one video. This selection of a time point in a timeline of the selected video allows the different video effects to be applied to different parts of the video. Additionally, the system may be implemented on a mobile device (such as a smart phone), thereby offering a portable editing tool to users. Therefore, the method and system of the present disclosure are simple to implement, effective, and easy to use. —According to an embodiment, activating means pressing the button and deactivating means releasing the finger (or a pointing device) from the pressed button.

The method for video editing comprises selecting at least one video, using a user interface. Specifically, the at least one video may be selected by a user associated with a user device configured to render the user interface thereon. More specifically, the user may select the at least one video for applying video editing effects thereto.

In an example, the user may select a video, using the user interface, for editing/modifying visual characteristics of the video. In another example, the user may select at least one video, for editing/modifying audio-visual characteristics of each of the at least one video. In yet another example, the user may select at least two videos for making a collaborative video. According to embodiments of the present disclosure, the term 'collaborative video' used herein relates to a video comprising the at least two videos. For example, the at least two videos constituting a collaborative video may be a guitar chords tutorial video without audio, and a guitar cover of the song 'Hotel California'.

In an embodiment, the user interface comprises at least one module through which the user interacts with the user device for purpose of video editing. Specifically, the user interface may be a graphical user interface including graphical icons, pull-down menus, dialog boxes, buttons, control options, visual indicators, and so forth, to facilitate user-friendly interaction between the user and the user device, as opposed to conventional text-based interfaces. More specifically, the user interface allows the user to perform video editing by selecting desired options thereon, and presents information and/or data, indicating effects of the user's manipulation, etc, to the user. In an example, the user interface may include a display window or display object/icon, which is selectable by the user of the user device for interaction therewith.

According to an embodiment, the at least one video comprises at least one of: a real-time recording of a video, a recorded video. Specifically, the user may select at least one of the real-time recording of a video, and the recorded video for purpose of video editing. More specifically, the real-time recording of the video may be captured using a camera of the user device. In an example, the at least one video may comprise a real-time recording of a dance tutorial video. In another example, the at least one video may comprise two recorded videos. In yet another example, the at least one video may comprise a real-time recording of an event, and a recorded video from organisers of the event.

In an embodiment, the term 'recorded video' used herein refers to a video that may be previously recorded using a suitable device (such as a digital camera, a spy pen camera, a smart phone, and so forth) and made available to the user for video editing. In an embodiment, the recorded video is stored on the user device. Specifically, the recorded video may be stored on a memory unit on the user device. In another embodiment, the recorded video is stored on a memory unit of a user device of another user and is fetched (or accessed) for editing by the user over a network (such as the Internet). In yet another embodiment, the recorded video is stored on a server communicably coupled to the user device, and is fetched for editing by the user over a network (such as the Internet).

The method further comprises displaying one of the selected at least one video, on a video preview area on the user interface. Specifically, the displayed one video may be a video on which video editing may be implemented, at a given time. More specifically, one of the selected at least one video may be displayed so as to enable viewing/previewing of videos one at a time, to facilitate video editing in a user-friendly manner. However, in an embodiment, each of the selected at least one video may be displayed on the video preview area on the user interface. In an embodiment, the video preview area is an area (or a section) on the user interface whereat at least one video may be displayed. Hereinafter, the terms 'displayed one video' and 'displayed video' are used interchangeably throughout the description, without difference in their meaning.

The method further comprises providing at least one effect button on the user interface, to be activated by applying a pointing device at the at least one effect button, wherein each of the at least one effect button is associated with one video editing effect. Specifically, the at least one effect button may be employed by the user editing the selected at least one video. In an embodiment, the at least one effect button is a circular icon on the user interface. In another embodiment, the at least one effect button is an icon of a shape other than a circular shape. According to another embodiment, the at least one effect button is configured to render a sample video thumbnail with the associated video editing effect. Specifically, the sample video thumbnail may provide the user with a preview of the associated video editing effect, prior to application thereof, on the displayed video.

In another embodiment, a timeline and a video preview area are displayed. Once the user has selected an effect, the user applies the effect by moving the finger on the video preview area. While the finger is moving on the video preview, the video is played back and the cursor moves in the timeline and effect is being applied on the position of the finger. The difference to the above-described is that the effect is selected by pressing the effect button and the effect is added when the user touches a place on the video preview area and moves his/her finger on the video preview area. In an alternative embodiment, while effect is being added, the video playback may happen slower than real-time (this way the user can fine-tune the position of the effect). In yet another embodiment, the effect might be added not exactly under the position of the finger but slightly left-above it (or another slightly off-set position). This would allow the effect to be better seen while being added.

Optionally, the pointing device is one of: a finger, a mouse, a stylus, a pen. Specifically, the user may control the pointing device interact with the user interface. More specifically, the user may provide inputs to the user interface by employing the pointing device.

The method further optionally comprises selecting a time point in a timeline of the displayed one video. Specifically, the user may interact with the user interface, to select the time point in the timeline. More specifically, the user may apply the pointing device at the time point for selection thereof. In an embodiment, the timeline is a visual representation of a time duration of the displayed video on the user interface, from beginning of the displayed video to end of the displayed video. For example, the timeline may represent a starting point of the displayed video, an ending point of the displayed video, and a visual cue connecting the starting and ending points of the displayed video.

In an embodiment of the present disclosure, the time point is any time instant on the timeline, wherefrom, video editing effects are to be applied to the displayed video. In one embodiment, the time point is the starting point of the displayed video if no selection of the time point is detected. In another embodiment, the time point is the starting point of the displayed video. In yet another embodiment, the user selects a plurality of time points in the timeline of the displayed video, so as to apply video editing effects at a plurality of time instants of the displayed video. Specifically, the selected plurality of time points may be referred to as a first time point, a second time point, and so forth. Therefore, the first time point may be a beginning of a first section, and the second time point may be a beginning of a second section of the displayed video on the video preview area, and so forth.

According to an embodiment, the user interface further comprises a cursor. Specifically, the cursor may be an indicator of the time point on the timeline. More specifically, the cursor may be movable along the timeline to select the time point on the timeline, based on an input from the user. In an embodiment, the cursor automatically appears on the timeline. In another embodiment, the cursor appears on the timeline based on the input from the user.

The method for video editing further comprises activating an effect button selected from the at least one effect button provided. Specifically, the user may activate the effect button by applying the pointing device at the effect button. More specifically, the user may activate the effect button to activate application of the video editing effect corresponding to the effect button, from the selected time point on the timeline. In an embodiment, the effect button may be activated by the user, by establishing contact of the pointing device with the effect button. For example, the user may tap and hold an effect button on the user interface, using a stylus.

The method for video editing further comprises applying a video editing effect corresponding to the activated effect button from the selected time point forward until detecting de-activation of the activated effect button. Specifically, the video editing effect corresponding to the activated effect button may be applied from the selected time point forward until the user deactivates the effect button by removing contact of the pointing device away from the effect button. Additionally, the video editing effect corresponding to the activated effect button may also be applied at another time point by selection of the another time point on the timeline of the displayed video, followed by activation of the effect button.

For example, the user may select a recorded piano tutorial video for video editing. Thereafter, the selected piano tutorial video is displayed on the video preview area, and four effect buttons may be provided on the user interface, wherein each of the four effect buttons is associated with one video editing effect. The user may select a time point in a timeline of the displayed piano tutorial video and activate an effect button selected from the four effect buttons provided to apply a video editing effect corresponding to the activated effect button from the selected time point forward until he/she wishes to deactivate the activated effect button. In such example, the applied video editing effect may be a delayed effect so that finger movements of an instructor of the recorded piano tutorial video may be clearly visible to a viewer.

In an embodiment the activated effect button changes in appearance to indicate that the video editing effect corresponding to the activated effect button is being applied among other video editing effects. For example, the activated effect button may change in size, colour, and so forth, to indicate that the video editing effect associated with the activated effect button is being applied to the displayed video.

In an embodiment, the video editing effect comprises at least one of: a mirror effect, a delayed effect, a fuzzy effect, a colour effect, a black and white effect, a video collaboration effect. Further, the video editing effect may comprise effects such as audio editing effect, resizing effect, object addition effect, and so forth. For example, the mirror effect may relate to depicting mirror reflection(s) of visual content of the displayed video, the fuzzy effect may relate to blurring the visual content of the displayed video, and the colour effect may relate to customizing colour of the visual content of the displayed video.

In an embodiment, the video collaboration effect comprises a combination of at least two videos, for creating the collaborative video. In an embodiment, the video collaboration effect comprising selection of the at least two videos may be indicated on an effect button associated with the video collaboration effect, by use of icons or numbers to indicate the at least two videos constituting the collaborative video. Specifically, the video collaboration effect comprising a combination of at least two videos may be applied to the displayed video, so as to combine the displayed video with at least one other video. For example, the user may select two videos named 'VID 1' and 'VID 2' using the user interface, from which the 'VID 1' is displayed on the video preview area. After analysing the provided at least one effect button on the user interface, the user may select a time point in a timeline of the 'VID 1'. Thereafter, the user may bring his/her finger into contact with an effect button corresponding to a video collaboration effect comprising a combination of the 'VID 1' and the 'VID 2', to apply the video collaboration effect until the finger is removed from the effect button.

In an embodiment, upon activation of the video collaboration effect comprising combination of at least two videos, the combination of at least two videos (or the collaborative video) is displayed on the video preview area. In an example, the combination a piano cover of a song, and a guitar cover of the song may be combined and displayed on the video preview area after activation of an effect button indicating combination of the two videos.

In an embodiment, the combination of at least two videos comprises a visual effect associated with arrangement of the at least two videos with respect to each other. Specifically, the visual effect associated with the arrangement of the at least two videos with respect to each other, may relate to a visual representation of the least two videos in a certain manner. In an embodiment, the visual effect associated with arrangement of the at least two videos includes, but is not limited to, a horizontal (or side by side) arrangement of the at least two videos, a vertical (or top-bottom) arrangement of the two videos, and a diagonal arrangement of the at least two videos. Referring to the aforementioned example of the selected 'VID 1' and 'VID 2', the combination of the 'VID 1' and the 'VID 2' may be associated with a horizontal arrangement of the VID 1' and the 'VID 2'.

In an embodiment, the video collaboration effect further comprises a collaborative video editing effect. Specifically, the collaborative video editing effect may relate to editing the audio-visual characteristics of the collaborative video. For example, the collaborative video editing effect includes, increasing the brightness of the collaborative video, reducing the frame rate of the collaborative video, adding an audio for playback along with the collaborative video, adding comments to the collaborative video, and so forth.

In an embodiment, the video collaboration effect comprises control of an audio track of the collaborative video. Specifically, the audio track of the collaborative video may be controlled by the user by activating an effect button associated with the control of the audio track. According to an embodiment, the audio track of the collaborative video is selected from a pre-recorded audio track, an audio track of one of the selected at least one video and the combination of the audio tracks of the at least two videos.

In an example, the audio track of the collaborative video may be an external pre-recorded track selected by the user. In another example, the audio track of the collaborative video may be a combination of all audio tracks of the at least two videos. For instance, if a collaborative video includes two videos such as a video of a vocalist singing a song, and a video of a guitarist playing the song, the audio track of the collaborative video may be a combination of audio of the vocalist's video and audio of the guitarist's video. In yet another example, the audio track of the collaborative video may be an audio track of one of the selected at least one video. For instance, if a collaborative video includes two videos such as a video of an artist sketching and a video tutorial about sketching, the audio track of the collaborative video may be audio of the video tutorial about sketching.

According to an embodiment, applying the video editing effect corresponding to the activated effect button from the selected time point forward comprises detecting deactivation of the activated effect button, and applying the video editing effect corresponding to the deactivated effect button from the selected time point forward for a pre-determined time duration. Specifically, instead of pressing and holding the effect button from the time point forward to apply the video editing effect, the user may simply tap and remove the pointing device on the effect button to apply the video editing effect for the pre-determined time duration. For example, the user may tap and remove their finger on an effect button and the video editing effect corresponding to the deactivated effect button may be applied to the at least one video in the video preview area for a pre-determined time duration, such as 10 seconds.

In an embodiment, the pre-determined time duration is dynamic and is selected by an audio-visual characteristic of the selected at least one video. Specifically, the pre-determined time duration may vary depending on the audio-visual characteristic of the displayed video in the video preview area. In an example, applying the video collaboration effect may stop at a scene cut in the displayed video, or applying the video collaboration effect may vary with beats of the underlying audio in the displayed video. In another example, applying the video collaboration effect may stop at end of the displayed video.

In another embodiment, the pre-determined time duration is static (or fixed). Specifically, the pre-determined time duration is a pre-set, constant time duration. Examples of the static time duration include, but are not limited to, 5 seconds, 10 seconds, 20 seconds, 30 seconds, 1 minute, 5 minute, 10 minutes, and 15 minutes.

According to an embodiment, applying the video editing effect corresponding to the activated effect button from the selected time point forward, depends on a gesture of the user until detecting de-activation of the activated effect button. Specifically, the gesture of the user may include any gesture made by the pointing device used by the user. For example, applying the video collaboration effect corresponding to the activated effect button may depend on a finger pressure of the user. In such example, the video collaboration effect corresponding to the activated effect button may be applied to the displayed video as long as the finger pressure of the user is above a threshold value. In another example, the user may move a stylus in up, down, left or right directions after activation of the effect button to control the corresponding video collaboration effect.

According to another embodiment, applying the video editing effect corresponding to the activated effect button from the selected time point forward comprises detecting deactivation of the activated effect button, and applying the video editing effect corresponding to the deactivated effect button from the selected time point forward until selection of an end time point in the timeline of the displayed one video. Specifically, the end time point in the timeline may be selected by the user by applying the pointing device at a time instant later than the selected time point, immediately after deactivating the activated effect button. More specifically, the end time point may be selected within a pre-defined time interval (such as 5 seconds, 7 seconds, 10 seconds, and so forth) after deactivation of the activated effect button, failing which, the video editing effect may be applied until the end of the displayed video. In one example, the end time point may be selected by double tapping the pointing device at the timeline. In another example, the end time point may be selected by long pressing the pointing device at the timeline.

In embodiment, the end time point is depicted by a cursor, visually distinct from the cursor indicating the time point of start of application of video editing effects to the displayed video. For example, the cursor indicating the selected time point of start of application of video editing effects may be green in color, while the cursor indicating the end time point may be red in color.

In an embodiment, the method further comprises defining a plurality of effect descriptors, wherein the plurality of effect descriptors describe at least one video editing effect applied to a plurality of videos by a plurality of users, sending the plurality of effect descriptors to a server communicably coupled to a plurality of user devices associated with the plurality of users, via a network, and sharing at least one effect descriptor of the plurality of effect descriptors with at least one user of the plurality of users based on a popularity of each of the plurality of effect descriptors, wherein the at least one effect descriptor is executed on at least one user device associated with the at least one user to edit the selected at least one video. Specifically, an effect descriptor may include a detailed description of a video editing effect, user experiences associated with application of the video editing effect, user recommendations pertaining to application of the video editing effect, and so forth. More specifically, the server may share the at least one effect descriptor with the at least one user as default operation and/or upon request by the at least one user.

In another embodiment, the method further comprises sending a feedback to a user associated with defining the at least one effect descriptor for notifying the user about usage of the at least one effect descriptor by the at least one user in the network. In yet another embodiment, the sharing of the at least one effect descriptor comprises sharing the at least one effect descriptor with the at least one user based on a preference of the at least one user. Specifically, if video editing history of the at least one user indicates that the at least one user prefers use of colour effects, then at least one effect descriptor pertaining to a new tinted colour effect may be shared with the at least one user.

Optionally, the method comprises displaying, in a time-synchronised manner, at least one recorded video on the video preview area on the user interface, while recording a video. All the features and embodiments disclosed herein apply mutatis mutandis to the step of time-synchronised manner of display in the method. Optionally, the at least one recorded video is associated with the user and is stored on the user device. In an embodiment, the at least one recorded video is associated with at least one user and may be selected by a user implementing video editing, prior to recording the video.

In an embodiment, the displaying is performed using picture-in-picture technology. Specifically, simultaneous displaying or play back of the at least one recorded video and the recording of the video may allow the user to create a real-time recording of the video that is synchronised with the at least one recorded video. In an embodiment, the at least one recorded video may be displayed as a preview on a collaborative video preview area. In an example, the user may have a recorded dance tutorial video on the user device, and may synchronously record his/her real-time recording of same dance steps as the recorded dance tutorial video. Further, in such example, the user may select the recorded dance tutorial video and his/her real-time recording for creating a collaborative dance video by implementing the described method for video editing.

In one embodiment, a preview of the at least one recorded video starts play back when the user starts recording the video, and the preview of the at least one recorded video pauses play back when the user pauses real-time recording of the video.

According to an embodiment, the collaborative video preview area is an area (or a section) on the user interface. Specifically, the collaborative video preview area is a part of the video preview area, and is used to display a preview of the at least one recorded video, while recording a video.

The system for video editing comprises the user interface rendered on the user device associated with the user, the user interface comprising the at least one effect button, the video preview area, and the timeline, an Input/Output module, and a processing unit. Specifically, the system may be hardware, software, firmware, or a combination of these, configured to facilitate video editing and may be collectively referred to as "video editor".

In an embodiment, the user device is a small and portable computing device. Optionally, the user device is configured to connect to other user devices via a network, such as the Internet. In such embodiment, the user device comprises a communication module, suitable for facilitating and supporting communication with the other user devices. Examples of the user device include, but are not limited to, a smart phone, a tablet computer, a digital camera, a laptop computer, and a personal digital assistant (PDA).

According to an embodiment, the user device comprises a touch sensitive display (or screen) to render the user interface thereon and allow the user to provide input to the user device. In an embodiment, the touch sensitive screen is a small-sized screen. Specifically, the user may provide the input to the user device by touching or depressing a portion or a point on the touch sensitive screen using the pointing device. For example, the touch sensitive display may display a virtual keypad to the user, and the user can touch/tap keys of the keypad using a stylus to enter an input.

In one embodiment, the user device includes a camera to capture images and/or record videos. In an embodiment, the camera is integrated within the user device. In an alternative embodiment, the camera is a separate device and is not be integrated within the user device. Specifically, in such embodiment, the camera is communicably coupled to the user device to transfer the captured images and/or recorded videos thereto. In an embodiment, the user device also comprises a separate audio recording device. In another embodiment, the user device also comprises a memory unit. Specifically, the memory unit may be configured to store the captured images and/or recorded videos.

In an embodiment, the user interface rendered on the user device further includes at least one control option. Specifically, the at least one control option may include options on the user interface to control aspects (such as playback, effects, and so forth) of the displayed video on the video preview area and/or the at least one recorded video on the collaborative video preview area. In an embodiment, the at least one control option is displayed on the user interface as buttons or icons. In an embodiment, the at least one control option is displayed inside, or in close proximity to the video preview area.

Examples of the at least one control option include, but are not limited to, a play option, a delete option, an undo option, a record option and so forth. In an embodiment, the play option is displayed as a button inside the video preview area to preview the displayed video on the video preview area. In an embodiment, the undo option allows the user to undo or delete a change done to a section of the timeline of the displayed video on the video preview area. In an embodiment, the undo option allows the user to remove the last added video editing effect. In an embodiment, the record option allows the user to capture the real-time recording of a video. Optionally, the play option is used by the user to preview the selected at least one video with applied video editing effects, post implementation of the method for video editing.

As mentioned previously, the video preview area is an area (or a section) on the user interface whereat at least one video may be displayed. In an example, the video preview area may be used to display one of selected two recorded dance videos prior to application of video editing effects thereon. In another example, the video preview area may be used for displaying a selected animated video with video editing effects applied thereto. In yet another example, the video preview area may be used for displaying each of the selected at least one video as small thumbnails. In another example, the video preview area may be used for displaying the collaborative video.

In an embodiment, the timeline on the user interface includes at least one visual cue related to the selected at least one video indicating one or more properties of the selected at least one video to make it easier for the user to locate where to add at least one video editing effect. In another embodiment, one timeline represents all the selected at least one video. In yet another embodiment, the user interface comprises at least one unique timeline corresponding to each of the selected at least one video.

In an example of visual cue, if a part of the displayed video has different audio-visual characteristics as compared to another part of the displayed video, the timeline may visually indicate difference in those parts to the user. In another example of visual cue, a waveform of underlying audio associated with the displayed video may be displayed to the user along with the timeline. In yet another example of the visual cue, when the displayed video is a collaborative video, then different sections of the collaborative video may be indicated with dividers or visual separators within the timeline.

The system for video editing comprises the Input/Output module configured to receive selection of at least one video, display one of the selected at least one video, on the video preview area on the user interface, provide the at least one effect button on the user interface, to be activated by applying a pointing device at the at least one effect button, optionally receive a position on the timeline based on a time point input, and receive activation of an effect button of the at least one effect button, wherein each of the at least one effect button comprises an associated at least one video editing effect. In an embodiment, the Input/Output module is also configured to receive de-activation of an effect button of the at least one effect button, from the user. Specifically, de-activation of the effect button relates to removal of the pointing device, away from the effect button, such that the effect button is no longer in contact with the pointing device.

In an embodiment, the Input/Output module is configured to render the selected at least one video on the user interface, for example, on the video preview area, after application of at least one video collaboration effect thereto. In another embodiment, the Input/Output module is also configured to render the collaborative video on the user interface, after application of at least one video collaboration effect to the displayed video.

The system further comprises the processing unit configured to apply a video editing effect corresponding to the activated effect button from the time point forward until detection of de-activation of the activated effect button. Specifically, the processing unit may be hardware, software, firmware, or a combination of these, to implement application of video editing effects.

In an embodiment, the system further comprises the memory unit of the user device. Specifically, the memory unit may be used to store the selected at least one video.

In an embodiment, the system further comprises the server communicably coupled to the plurality of user devices associated with the plurality of users, via the network. In one embodiment, the server may comprise the processing unit such that the plurality of users may perform video editing remotely, whilst being communicably coupled to the server. In such embodiment, a part of video editing is implemented at the user device, and another part of video editing is implemented at the server.

According to an embodiment, the network may be wired, wireless, or a combination thereof. For example, the network includes, but is not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, a Personal Area Network (PAN), a Storage Area Network (SAN), a Home Area Network (HAN), a Campus Area Network (CAN), a Virtual Private Network (VPN), an Enterprise Private Network (EPN), Internet, a Global Area Network (GAN), and Worldwide Interoperability for Microwave Access (WiMAX) networks.

DETAILED DESCRIPTION OF THE DRAWINGS

Referring to FIG. 1, illustrated is an illustration of an environment 100 for using a system 102 for video editing (or a video editor), in accordance with an embodiment of the present disclosure. As shown, the environment 100 includes a user 104 associated with a user device 106. Further, the user device 106 includes the video editor 102. The video editor 102 includes a user interface (not shown) rendered on the user device 106 associated with the user 104, an Input/Output module (not shown), and a processing unit (not shown). Specifically, the user 104 may use the video editor 102 for editing at least one video.

Figure 2:
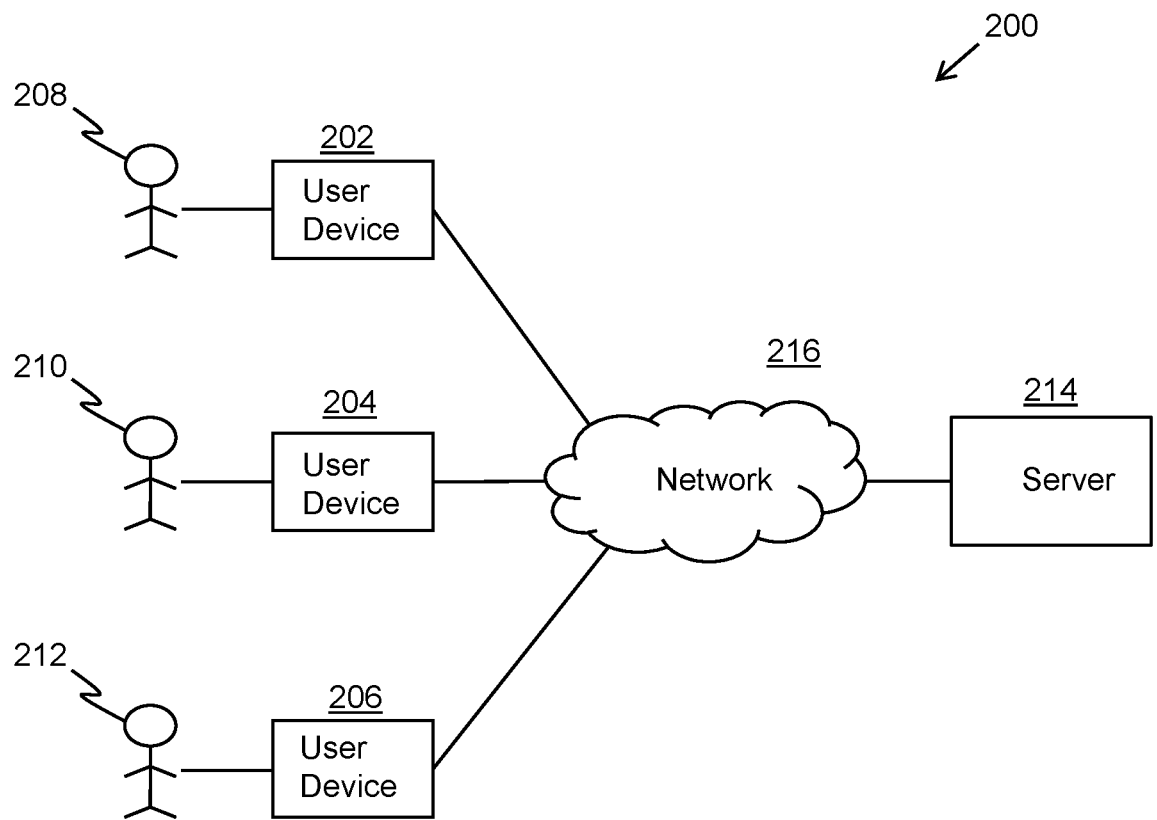

Referring to FIG. 2, illustrated is an illustration of an environment 200 for using a system for video editing (or a video editor), in accordance with another embodiment of the present disclosure. As shown, the environment 200 includes a plurality of user devices associated with a plurality of users, such as user devices 202, 204, and 206 associated with users 208, 210, and 212 respectively. The video editor includes user interfaces (not shown) rendered on the plurality of user devices 202-206, Input/Output modules (not shown), and processing units (not shown). Further, the video editor also includes a server 214 communicably coupled to the plurality of user devices 202-206 via a network 216. Therefore, the users 208-212 may use the video editor for editing at least one video.

Figure 3:
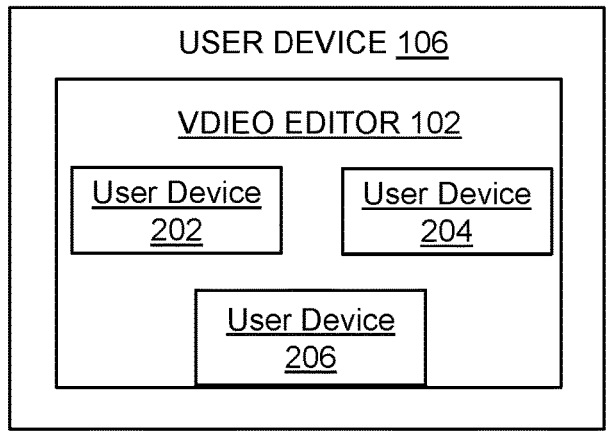
FIG. 3 is an illustration of modules of a user device, in accordance with an embodiment of the present disclosure.

Referring to FIG. 3, illustrated is an illustration of modules of a user device (such as the user device 106 of FIG. 1), in accordance with an embodiment of the present disclosure. The user device 106 includes the video editor 102 (as shown in FIG. 1). The video editor 102 includes a user interface 202, an Input/Output module 204, and a processing unit 206. Optionally, the user device 106 may also include a camera (not shown) and a memory unit (not shown).

Figure 4:
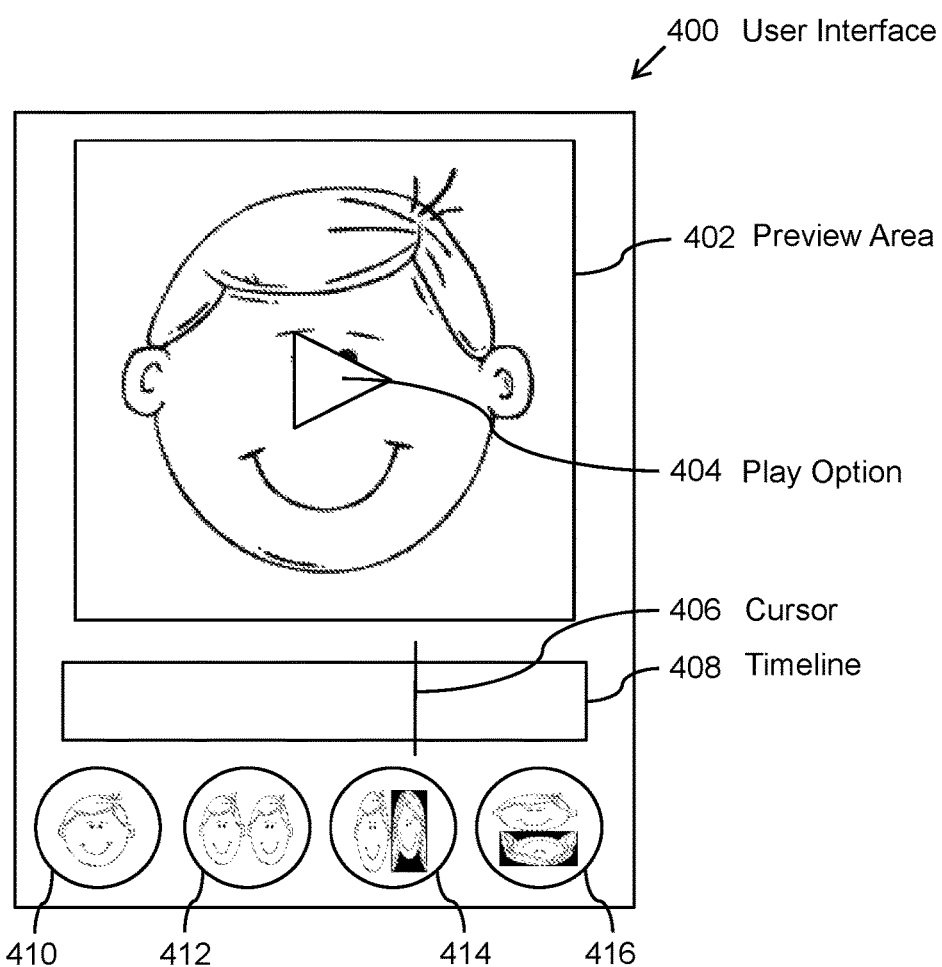
FIG. 4 is a schematic illustration of an exemplary user interface to apply video editing effects for editing a video, in accordance with an embodiment of the present disclosure.

Referring to FIG. 4, illustrated is a schematic illustration of an exemplary user interface 400 to apply video editing effects for editing a video, in accordance with an embodiment of the present disclosure. A user may utilise the user interface 400 on a user device (not shown) for editing the video. As shown, the user interface 400 includes a video preview area 402. A play option 404 is displayed as a button inside the video preview area 402 to preview (or play back) the video on the video preview area 402. A cursor 406 is configured to move along a timeline 408 of the video displayed on the user interface 400. A position of the cursor 406 on the timeline 408 of the video displayed in the video preview area 402 indicates a time point from where a video editing effect is to be applied to the video. The time point of the cursor 406 on the timeline of the video may be selected by the user, using a pointing device. Alternatively, the time point from where the video editing effect is to be applied may be a predetermined position, such as the start of the video. As shown, the user interface 400 also includes at least one effect button, such as the effect buttons 410, 412, 414, and 416 for adding video editing effects to the video. The effect buttons 410, 412, 414, and 416 may also be configured to render a sample video thumbnail with the associated video editing effect. In an example, the user may activate an effect button, such as the effect button 412, to apply a mirror effect corresponding to the effect button 412 from the depicted time point forward until detecting de-activation of the activated effect button 412. In another example, the user may activate an effect button, such as the effect button 414, to apply a video collaboration effect corresponding to the effect button 414 from the depicted time point forward until detecting de-activation of the activated effect button 414.

Figure 5:
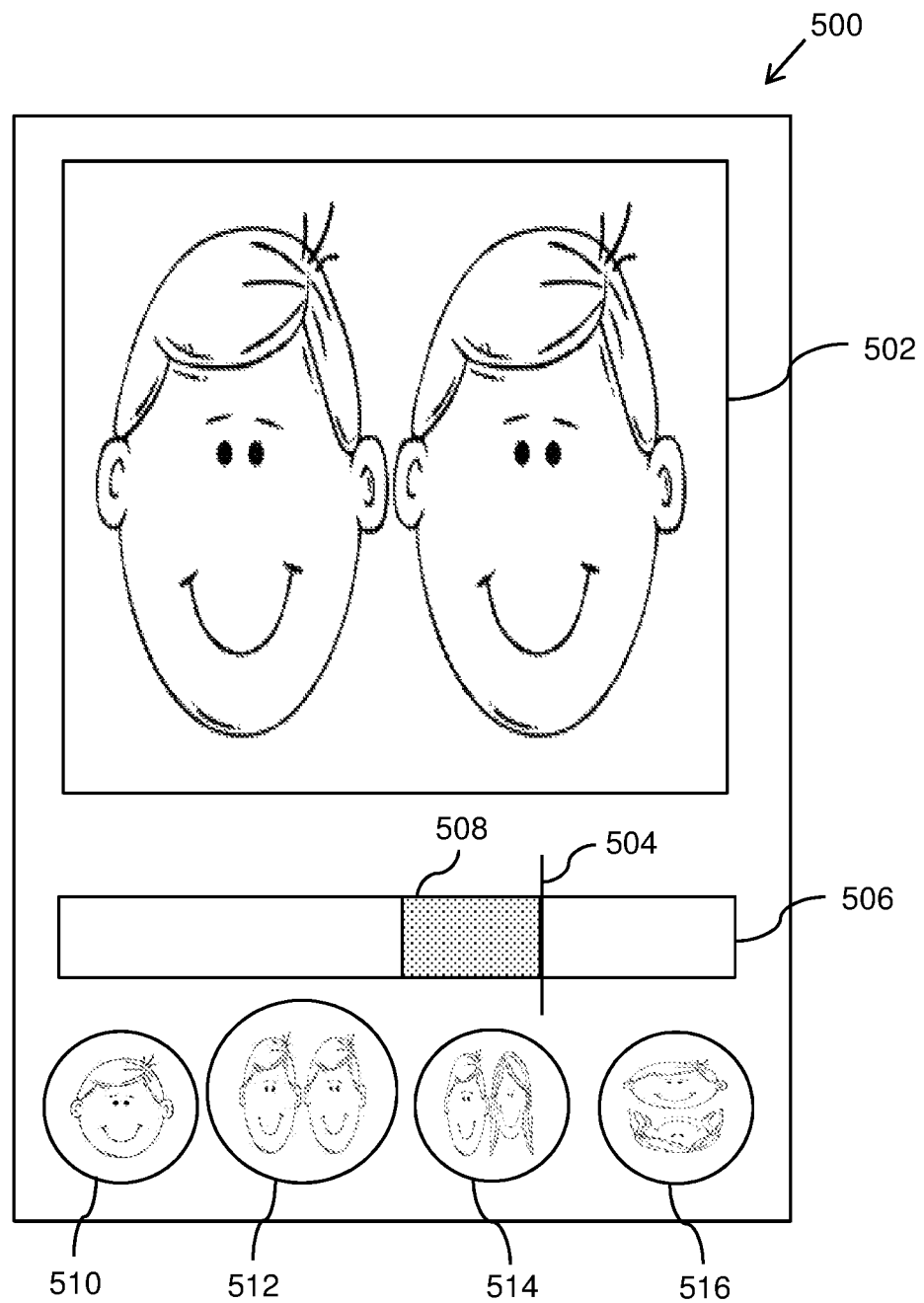
FIGS. 5-6 are schematic illustrations of changes in a user interface, while different effect buttons are activated, in accordance with different embodiments of the present disclosure.

Referring to FIG. 5, illustrated is a schematic illustration of a change in a user interface 500, while an effect button 512 is activated, in accordance with an embodiment of the present disclosure. The user interface 500 includes a video preview area 502 to display a video with a video editing effect applied. As shown, a cursor 504 moves along a timeline 506 of the video to indicate that the video editing effect is applied continuously. Consequently, a corresponding area (or section) 508 within the timeline 506, where the video editing effect is applied, may change its appearance as shown, indicating that the video editing effect is applied to the corresponding area 508. Further, the activated effect button 512 may change in size corresponding to other effect buttons 510, 514 and 516, as shown, to indicate that the video editing effect corresponding to the activated effect button 512 is being applied among other video editing effects. As depicted, the video editing effect corresponding to the activated effect button 512 is a mirror effect.

Figure 6:
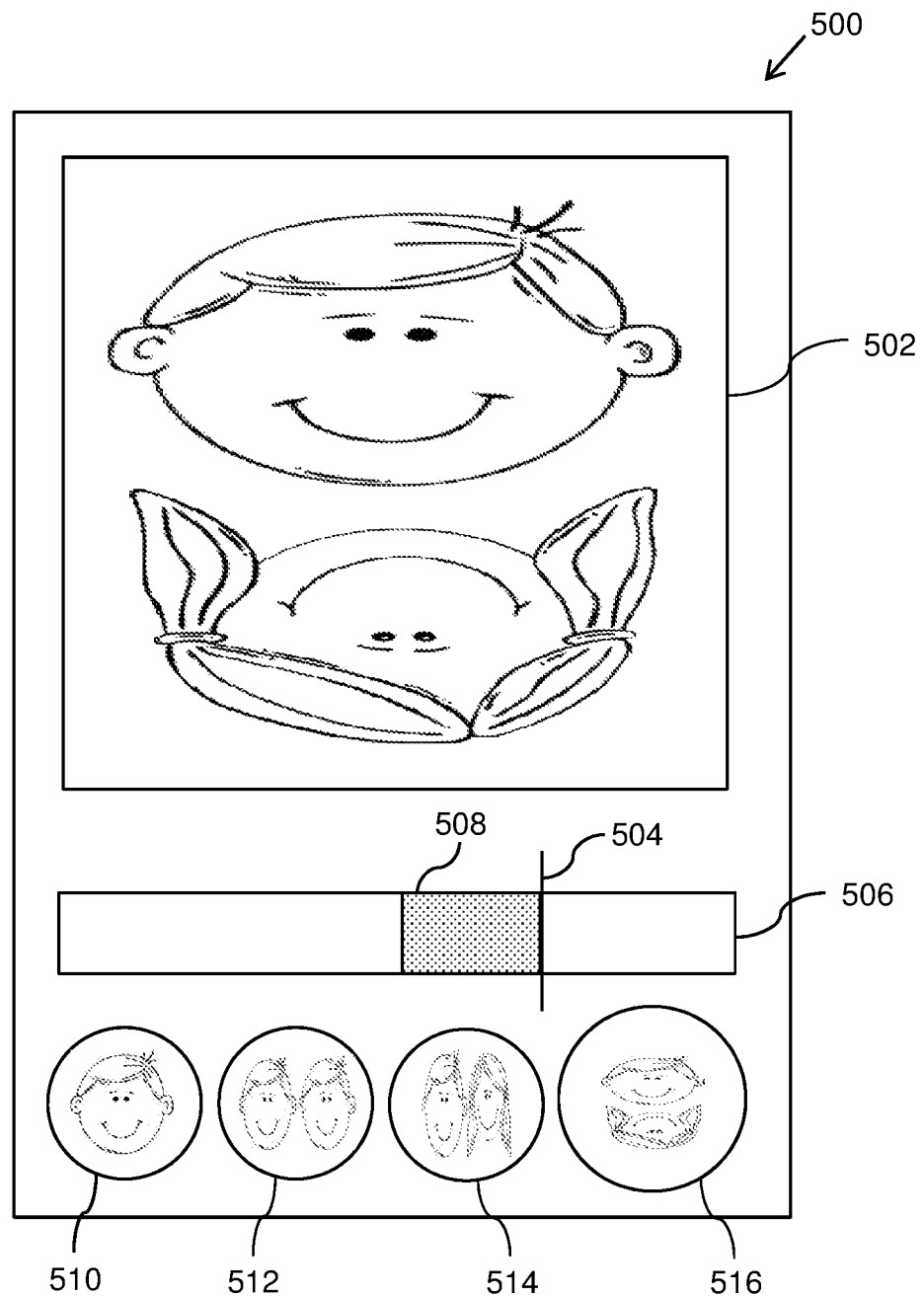

Referring to FIG. 6, illustrated is a schematic illustration of a change in the user interface 500, while the effect button 516 is activated, in accordance with another embodiment of the present disclosure. As depicted, the video editing effect corresponding to the activated effect button 516 is a video collaboration effect including a combination of two videos, for creating a collaborative video. Further, the activated effect button 516 may change in size corresponding to other effect buttons 510, 512 and 514, as shown, to indicate that the video editing effect corresponding to the effect button 516 is being applied among other video editing effects. As shown, the video preview area 502 of the user interface 500 displays the collaborative video with the video collaboration effect applied. It is to be noted that in the exemplary user interface 500, the video editing effect corresponding to the effect button 514 is also a video collaboration effect including the combination of two videos, for creating the collaborative video. However, the combination of two videos associated with the effect buttons 514 and 516 include visual effects associated with different arrangements of the two videos with respect to each other.

Figure 7:
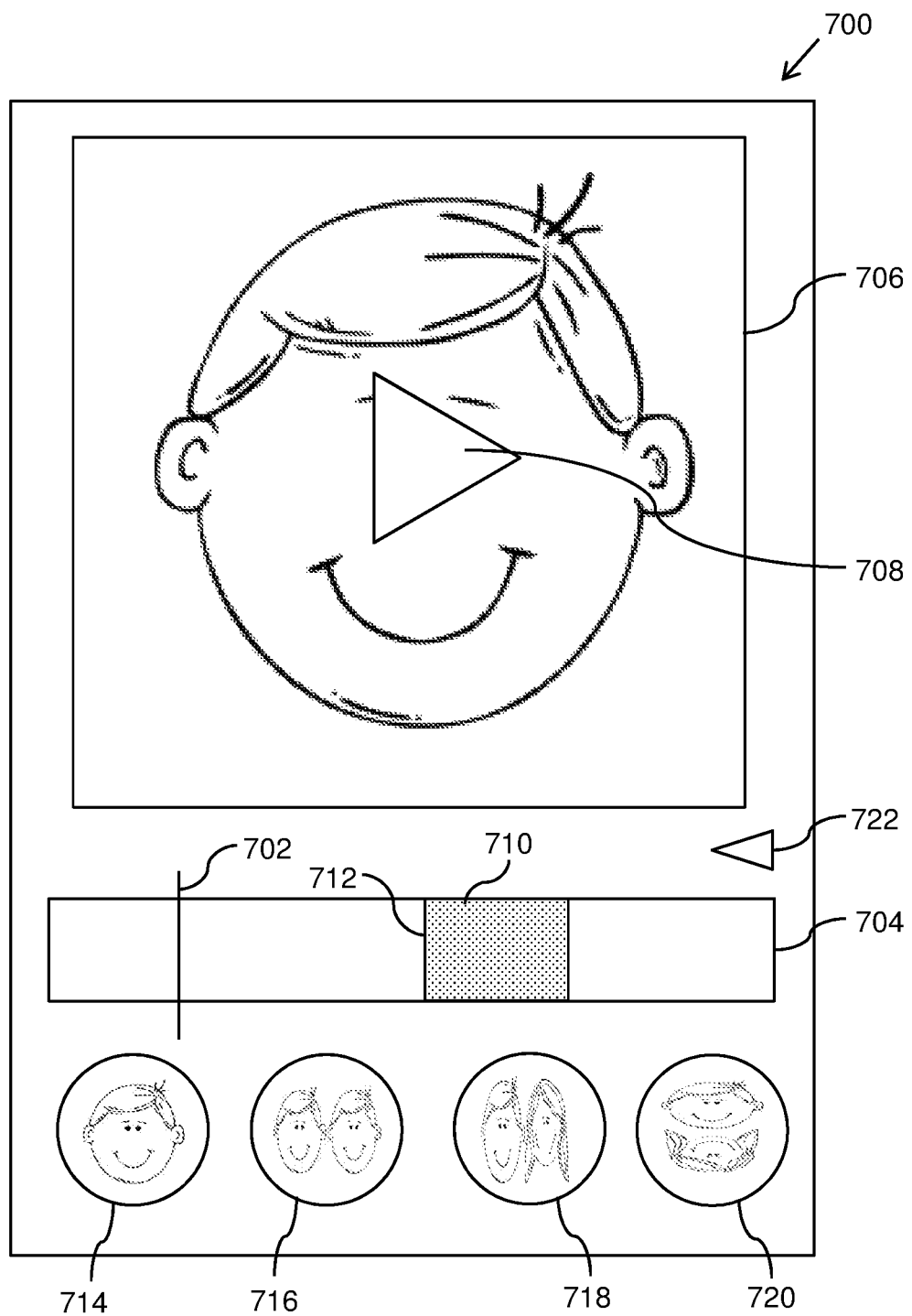
FIG. 7 is a schematic illustration of change in a user interface when a second time point in a timeline of a video is selected, in accordance with an embodiment of the present disclosure.

Referring to FIG. 7, illustrated is a schematic illustration of change in a user interface 700 when a second time point 702 in a timeline 704 of a video is selected, in accordance with an embodiment of the present disclosure. The user interface 700 includes a video preview area 706 to display a video, as shown. A play option 708 is also displayed as a button inside the video preview area 706 to preview (or play back) the video. The timeline 704 of the video includes a colored area 710, corresponding to a time duration of a previously applied video editing effect at a first time point 712 on the timeline 704. It may be noted that even though the second time point 702 is selected by positioning a cursor on the timeline 704, the colored area 710 indicating the previously applied video editing effect, is still visible in the timeline 704. As shown, the user interface 700 also includes effect buttons 714, 716, 718, and 720. Each of the effect buttons 714, 716, 718, and 720 is associated with a corresponding video editing effect. Additionally, the user interface 700 also includes an undo option 722 to allow a user to remove the last added video editing effect.

Figure 8:
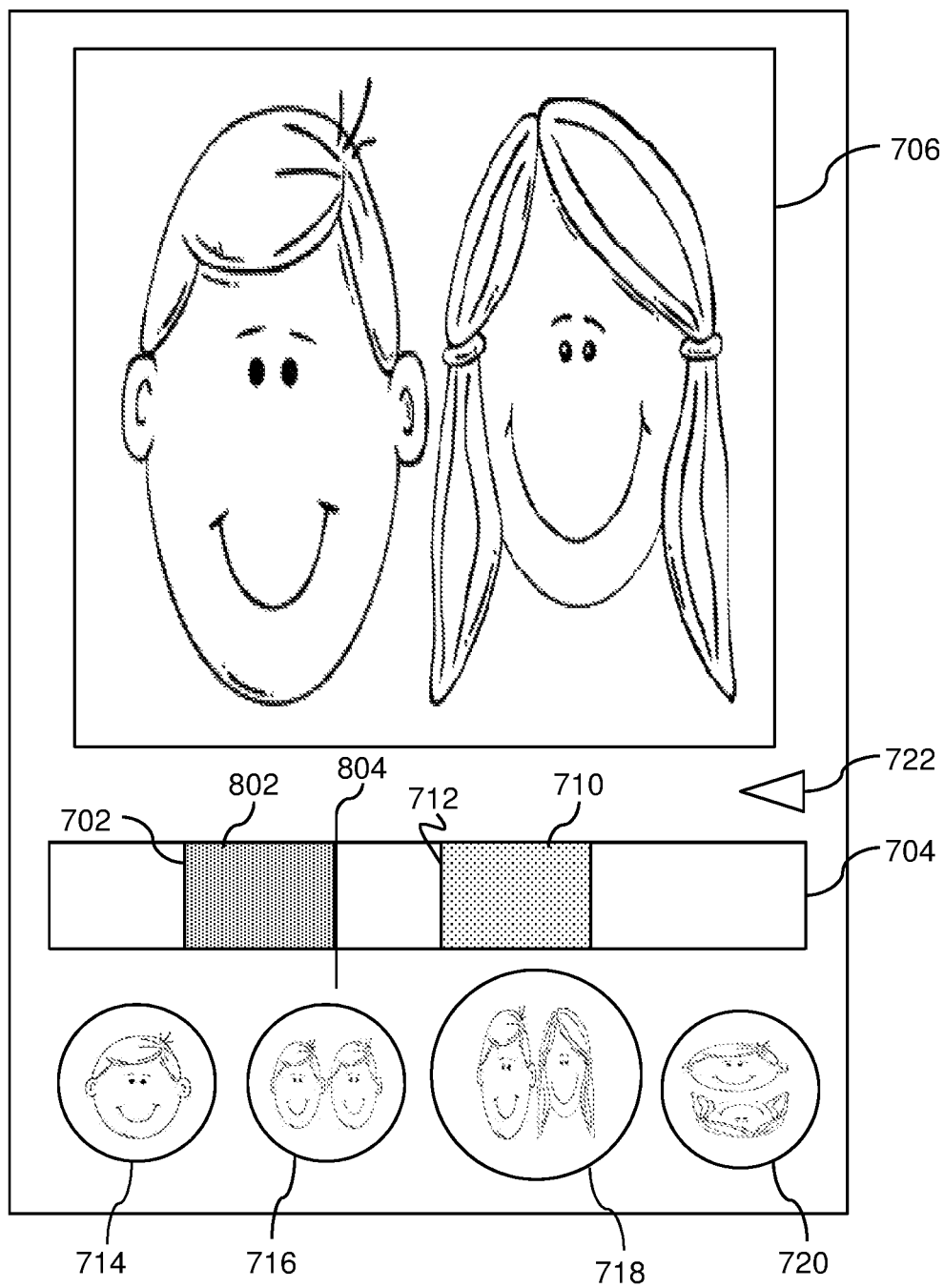
FIG. 8 is a schematic illustration of change in the user interface of FIG. 7 while an effect button is activated starting at the second time point in a timeline of a video, in accordance with an embodiment of the present disclosure.

Referring to FIG. 8, illustrated is a schematic illustration of change in the user interface 700 of FIG. 7 while the effect button 718 is activated starting at the second time point 702 in the timeline 704 of the video, in accordance with an embodiment of the present disclosure. As shown, the video is displayed on the video preview area 706 on the user interface 700. It is to be understood that the play option 704 of FIG. 7 is activated in FIG. 8 to play back the video and is therefore absent from FIG. 8. A user may select the second time point 702, for applying a video editing effect, corresponding to the activated effect button 718. As shown, the activated effect button 718 may change its size, to indicate that the video editing effect corresponding to the effect button 718 is being applied among other video editing effects corresponding to other effect buttons 714, 716 and 720. The user may activate the effect button 718 at the second time point 702, for a time duration indicated by a colored area 802 on the timeline 704. As shown, a cursor 804 moves along the timeline 704 of the video to indicate that the video editing effect corresponding to the effect button 718, is being applied continuously. It may be noted that even though the video editing effect from the second time point 702 is being applied, the colored area 710 indicating the previously applied video collaboration effect at the first time point 712, is still visible in the timeline 704.

Figure 9:
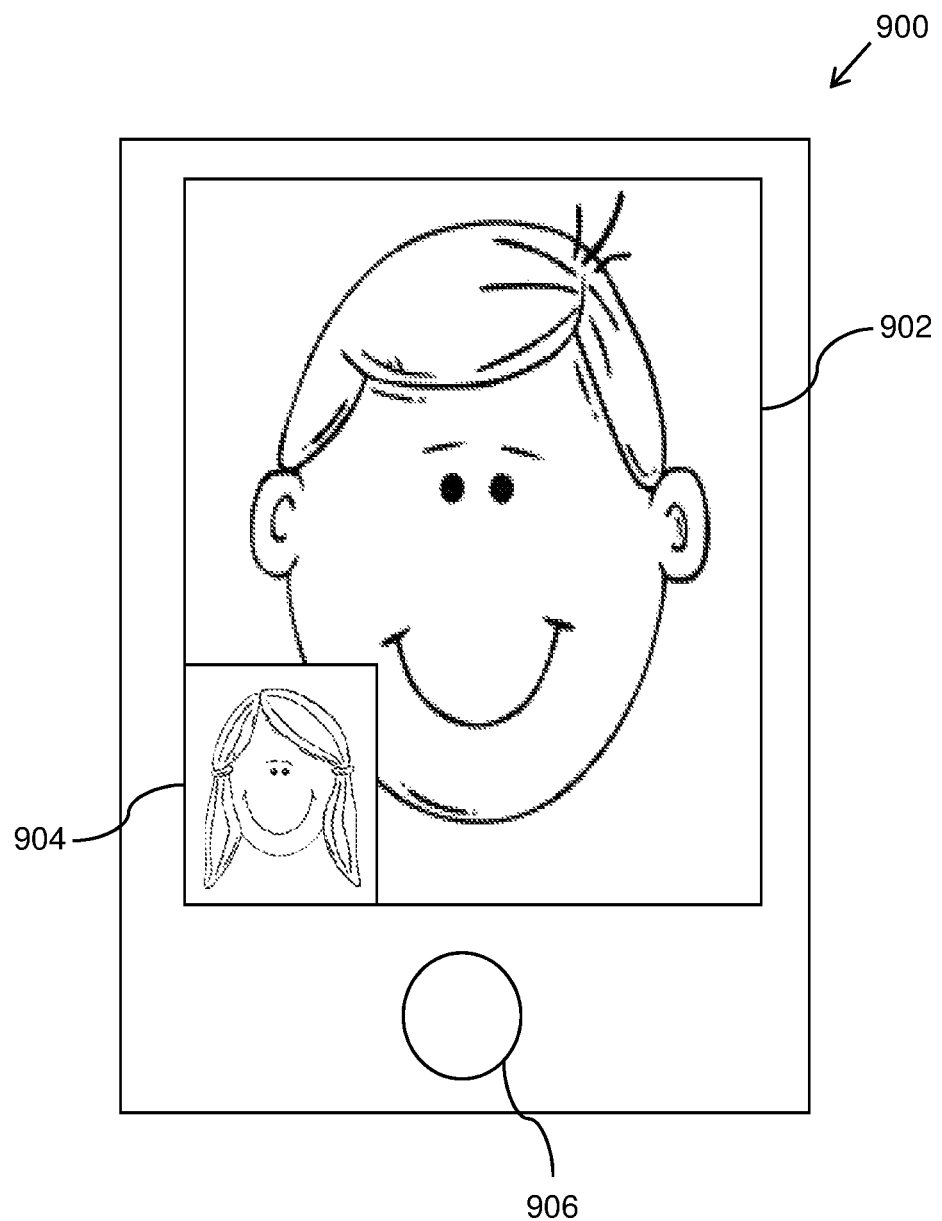
FIG. 9 is a schematic illustration of an exemplary user interface for editing a video, in accordance with an embodiment of the present disclosure.

Referring to FIG. 9, illustrated is a schematic illustration of an exemplary user interface 900 for editing a video, in accordance with an embodiment of the present disclosure. Specifically, in FIG. 9, editing the video includes making a collaborative video by applying a video collaboration effect. Further, the user interface 900 may be rendered on a user device (such as the user device 106 of FIG. 1). The user interface 900 includes a video preview area 902 including a collaborative video preview area 904. It is to be understood that the collaborative video preview area 904 depicts a part of the video preview area 902. Further, the user interface 900 also includes a record option 906 for recording a video using a camera (not shown) of the user device. The real time recording of the video may be displayed on the video preview area 902 while the collaborative video preview area 904 may display a preview of a recorded video. Further, the recorded video displayed on the collaborative video preview area 904 starts playback when the record option is activated by a user. Therefore, the recorded video is displayed in a time-synchronised manner on the video preview area 902 (and specifically, on the collaborative video preview area 904) while recording the video using picture-in-picture technology.

Figure 10:
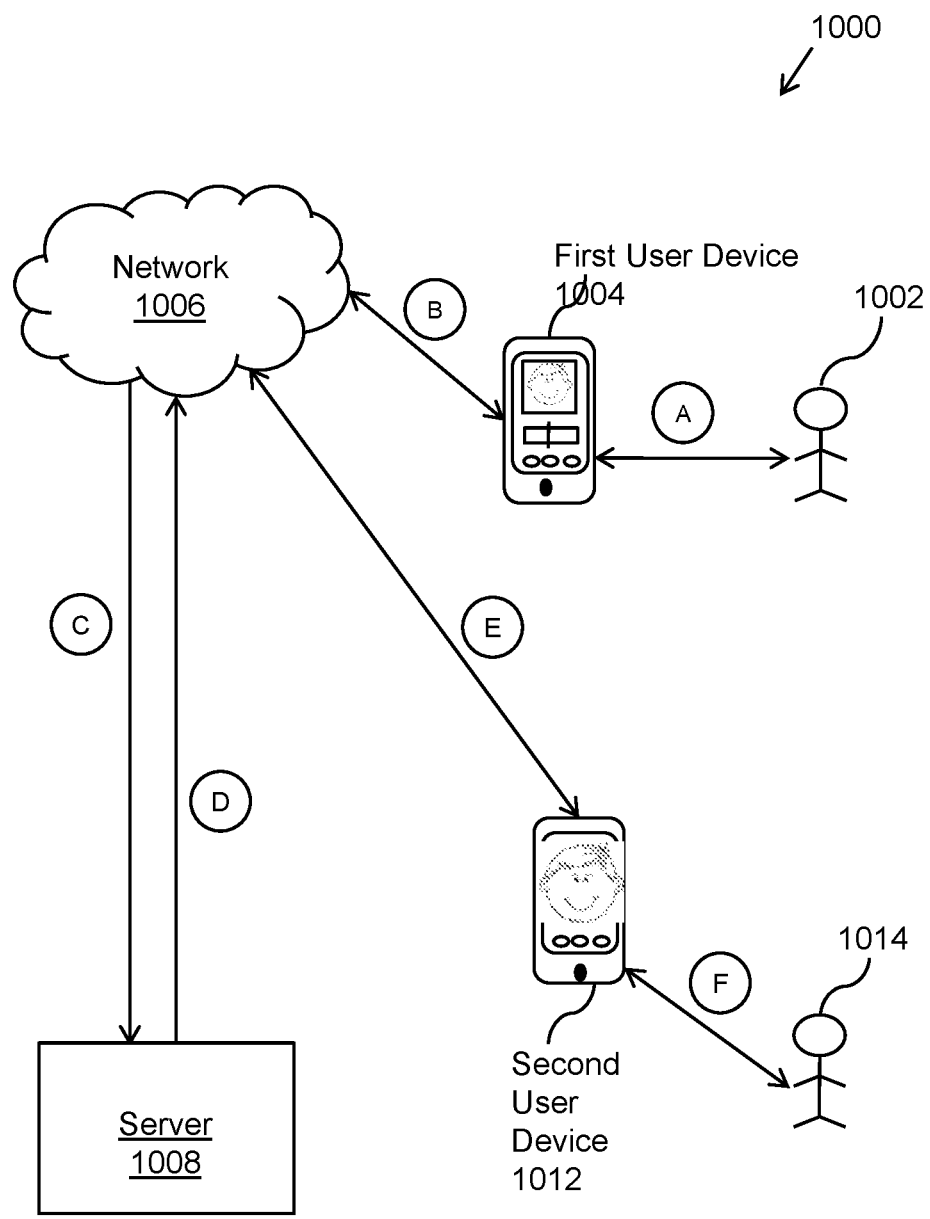
FIG. 10 is a schematic illustration of a use case of a method for video editing, in accordance with an embodiment of the present disclosure.

Referring to FIG. 10, illustrated is a schematic illustration of a use case 1000 of a method for video editing, in accordance with an embodiment of the present disclosure. At step 'A', a first user 1002 uses his/her first user device 1004 such as a smart phone, for editing a video by applying different effects to different time segments of a video. Thereafter, at step 'B', the first user 1002 defines and sends an effect descriptor to a server 1008 communicably coupled to the first user device 1004, via a network 1006. At step 'C', the server 1008 receives the effect descriptor. Thereafter, at step 'D', the server 1008 sends the effect descriptor to a second user device 1012 associated with a second user 1014, via the network 1006. Consequently, at step 'E' the second user device 1012 receives the effect descriptor sent (or shared) by the server 1008. At step 'F', the second user 1014 executes the effect descriptor on the second user device 1012 to edit another video.

Figure 11A:
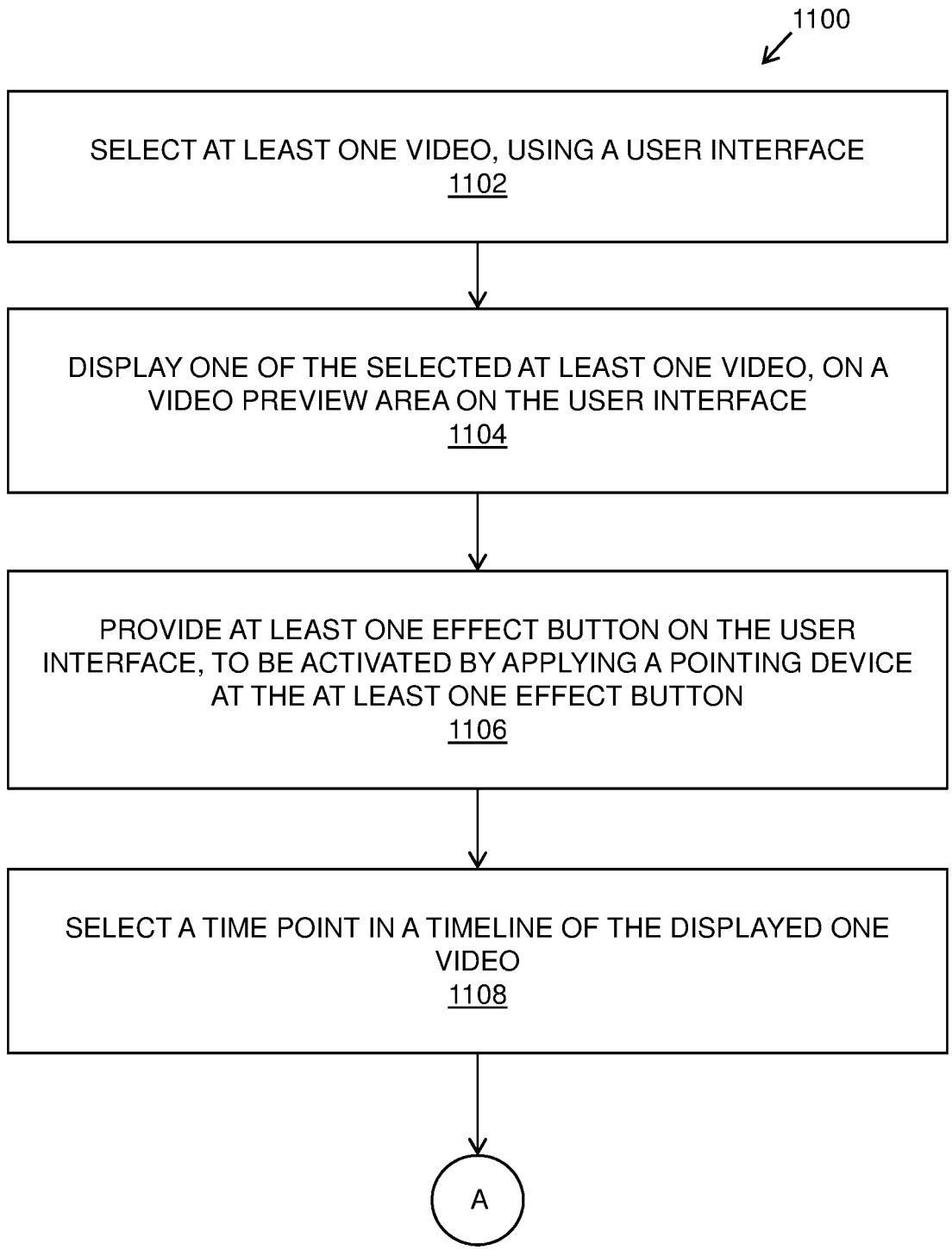
FIGS. 11A-11B illustrate steps of a method for video editing, in accordance with an embodiment of the present disclosure.
Figure 11B:
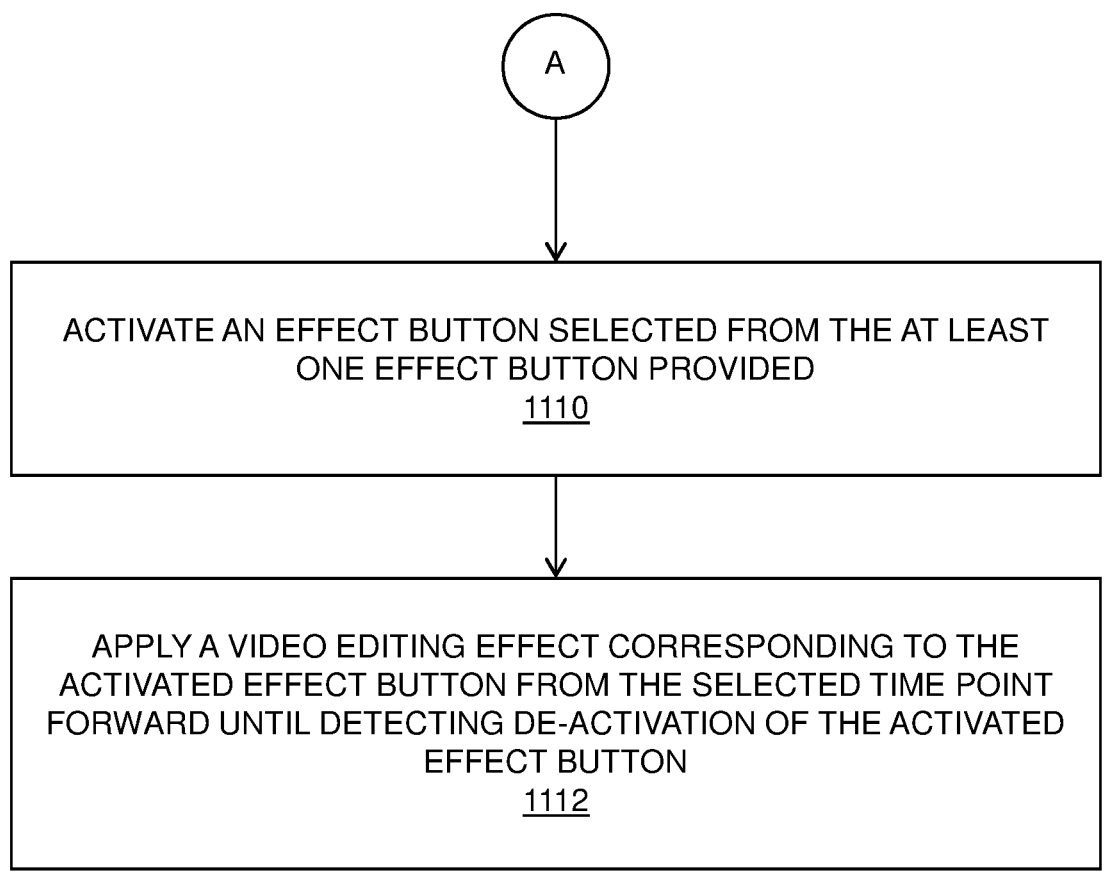

Referring to FIGS. 11A-11B, illustrated are steps of a method for video editing, in accordance with an embodiment of the present disclosure. At step 1102, at least one video is selected using a user interface. At step 1104, one of the selected at least one video is displayed on a video preview area on the user interface. At step 1106, at least one effect button is provided on the user interface, to be activated by applying a pointing device at the at least one effect button. Specifically, each of the at least one effect button is associated with one video editing effect. At step 1108, a time point is selected in a timeline of the displayed one video. At step 1110, an effect button selected from the at least one effect button provided, is activated. At step 1112, a video editing effect corresponding to the activated effect button is applied from the selected time point forward until detecting de-activation of the activated effect button.

Figure 12A:
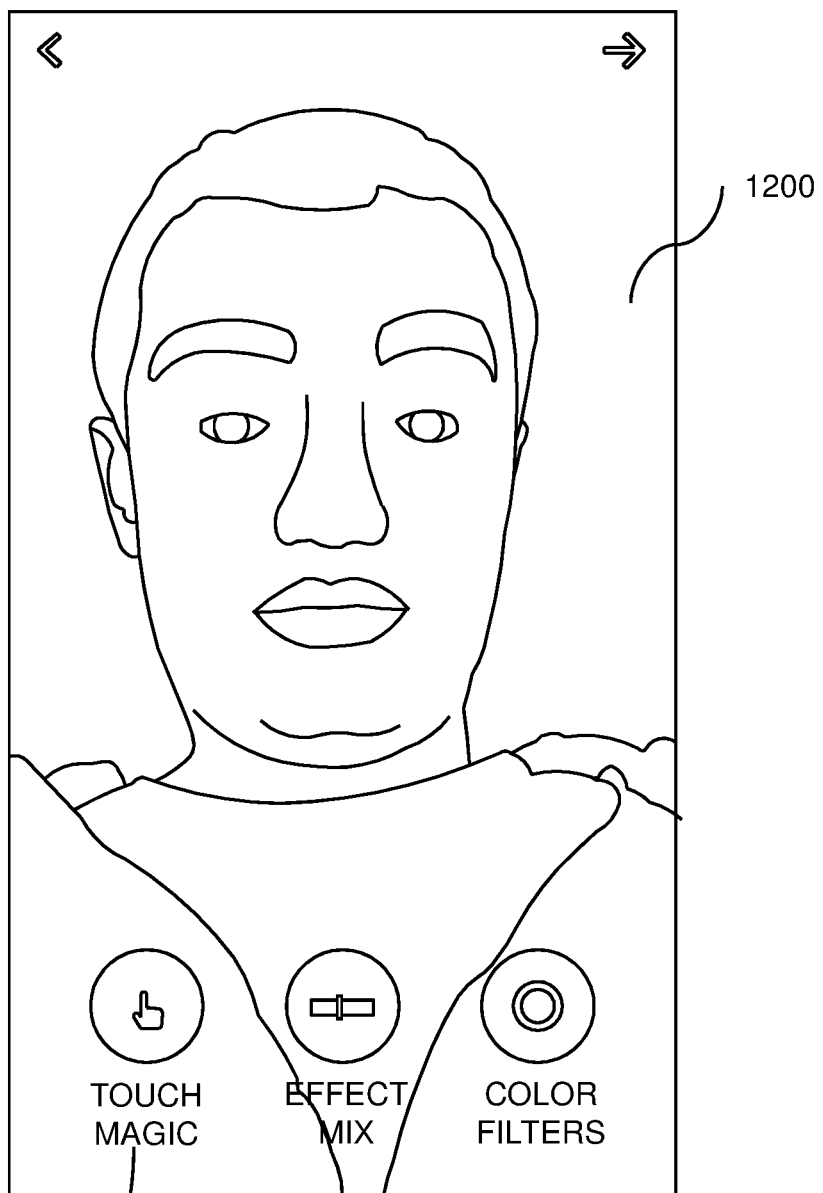
FIGS. 12A-12C is a schematic illustration of another embodiment of the present disclosure.
Figure 12B:
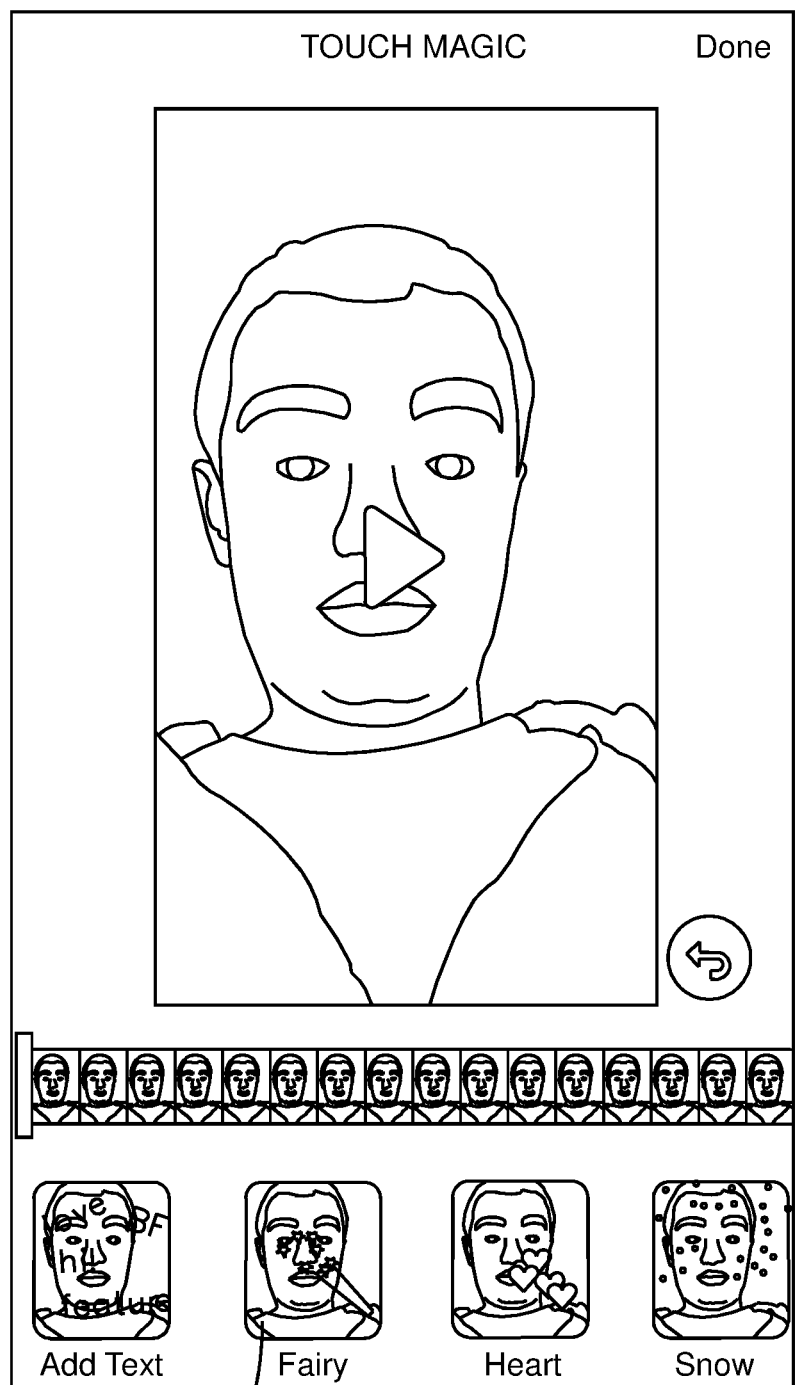
Figure 12C:
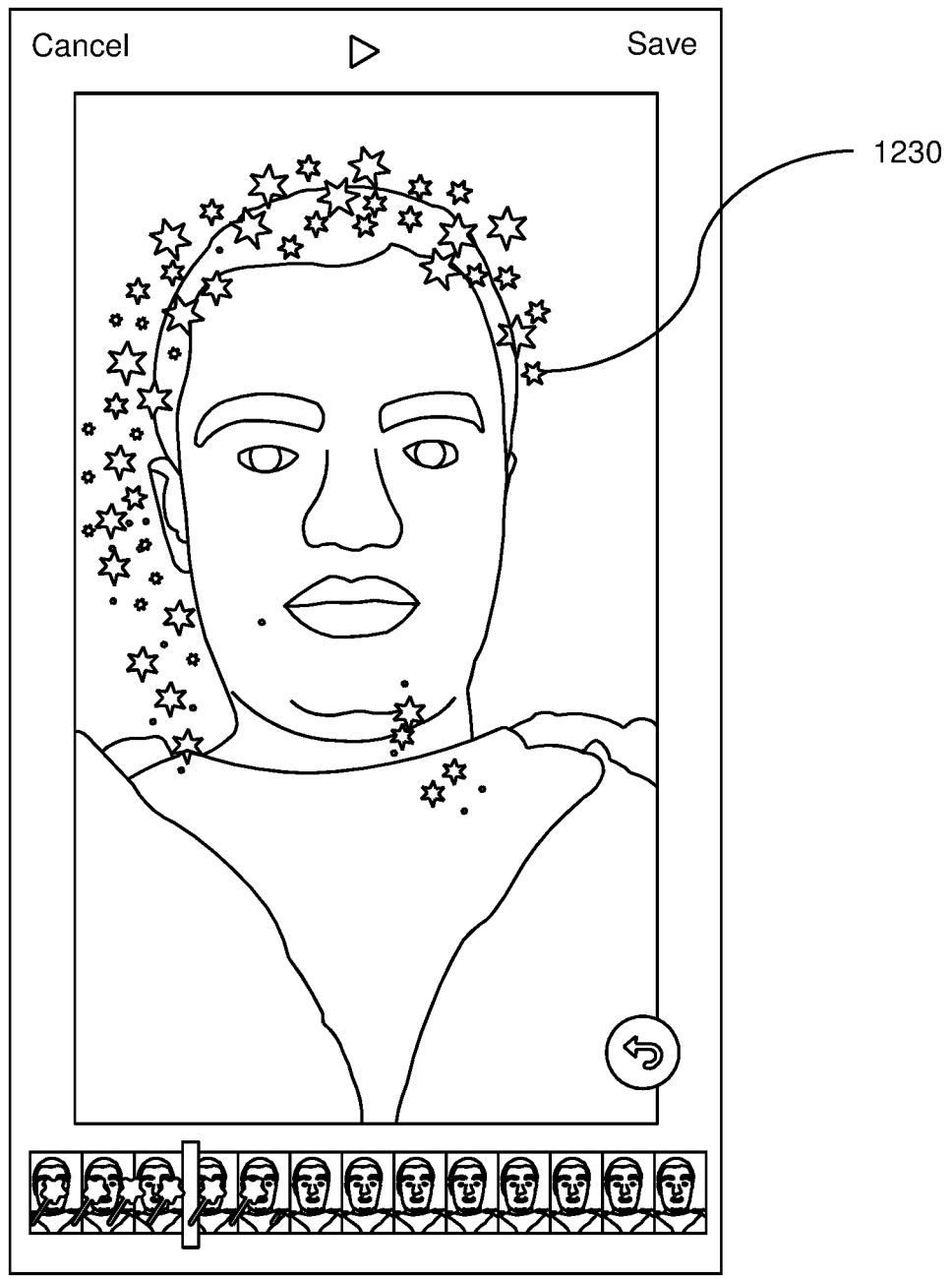

FIGS. 12A to 12C illustrate yet another embodiment of the invention. In this embodiment and as is shown in FIG. 12A, the user records a video to reach the main screen 1200. The user then presses the "Touch Magic"-button 1210 to reach the "Touch Magic"-screen, illustrated in FIG. 12B. Thereafter, the user can select an effect, such as "Fairy" 1220 and drag his/her finger on the video to add fairy particles 1230 on the video, as illustrated on FIG. 12C.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for video editing, the method comprising:
   selecting at least one video, using a user interface;
   displaying the selected at least one video on a video preview area on the user interface;
   providing at least one effect button on the user interface, the at least one effect button configured to be activated by applying a pointing device at the at least one effect button, wherein each of the at least one effect button is associated with one different video editing effect;
   presenting a timeline with the selected at least one video;
   selecting a time point on the timeline;
   detecting a selection of one of the at least one effect button, the detected selection comprising detecting a touching of an area on the user interface corresponding to the selected effect button;
   applying a video editing effect corresponding to the selected effect button to the selected at least one video at the selected time point until a de-selection of the selected at least one effect button is detected, wherein detection of the de-selection comprises detecting a non-touching of the selected effect button, wherein the timeline progress and the application of the video editing effect to the to the selected at least one video is presented in the video preview area of the user interface, wherein applying the video editing effect corresponding to the selected effect button at the selected time point comprises:
   detecting deactivation of the selected effect button; and applying the video editing effect corresponding to the deactivated effect button from the selected time point until selection of an end time point in the timeline of the displayed one video.

2. The method according to claim 1, wherein the at least one video comprises at least one of: a real-time recording of a video, a recorded video.

3. The method according to claim 2, wherein the method comprises displaying, in a time-synchronised manner, at least one recorded video on the video preview area on the user interface, while recording a video.

4. The method according to claim 3, wherein the displaying is performed using picture-in-picture technology.

5. The method according to claim 1, wherein the video editing effect comprises at least one of: a mirror effect, a delayed effect, a fuzzy effect, a colour effect, a black and white effect, a video collaboration effect.

6. The method according to claim 5, wherein the video collaboration effect comprises a combination of at least two videos, for creating a collaborative video.

7. The method according to claim 6, wherein the combination of at least two videos comprises a visual effect associated with arrangement of the at least two videos with respect to each other.

8. The method according to claim 6, wherein the video collaboration effect further comprises a collaborative video editing effect.

9. The method according to claim 6, wherein the video collaboration effect comprises control of an audio track of the collaborative video.

10. The method according to claim 9, wherein the audio track of the collaborative video is selected from a pre-recorded audio track, an audio track of one of the selected at least one video and the combination of the audio tracks of the at least two videos.

11. The method according to claim 1, wherein applying the selected video editing effect further comprises detecting a gesture of the user on the user interface until detecting de-selection of the selected effect button.

12. The method according to claim 1, wherein applying the selected video editing depends on a detected gesture of the user on the user interface, the detected gesture of the user being a continuous touching movement on the video preview area on the user interface.

13. A method according to claim 1, further comprising:
defining a plurality of effect descriptors, wherein the plurality of effect descriptors describe at least one video editing effect applied to a plurality of videos by a plurality of users;
sending the plurality of effect descriptors to a server communicably coupled to a plurality of user devices associated with the plurality of users, via a network; and
sharing at least one effect descriptor of the plurality of effect descriptors with at least one user of the plurality of users based on a popularity of each of the plurality of effect descriptors, wherein the at least one effect descriptor is executed on at least one user device associated with the at least one user to edit the selected at least one video.

14. The method according to claim 13, further comprising sending a feedback to a user associated with defining the at least one effect descriptor for notifying the user about usage of the at least one effect descriptor by the at least one user in the network.

15. The method according to claim 13, wherein the sharing of the at least one effect descriptor comprises sharing the at least one effect descriptor with the at least one user based on a preference of the at least one user.

16. A system for video editing, the system comprising:
a user interface rendered on a user device associated with a user, the user interface comprising at least one effect button, a video preview area, and a timeline;
at least one processor configured to execute non-transitory machine readable instructions, wherein execution of the non-transitory machine readable instructions by the at least one processor causes the processor to:
receive a detected selection of at least one video presented on the user interface;
display the selected at least one video on the video preview area on the user interface;
display a timeline associated with the selected at least one video in the video preview area of the user interface;
detect a selection of a timepoint on the timeline;
detect a selection of one of the at least one effect button, where detecting the selection of the one effect button comprises detecting a touch of an area of the user interface corresponding to the selected effect button;
apply a video editing effect corresponding to the selected effect button to the selected at least one video;
detect a deselection of the selected effect button, the detection of the deselection of the selected effect button comprising detecting a non-touching of the selected effect button; and
discontinue applying of the video editing effect to the selected at least one video, wherein the timeline progress and the application of the video editing effect to the to the selected at least one video is presented in the video preview area of the user interface;
wherein applying the video editing effect corresponding to the selected effect button at the selected time point comprises:
detecting the deselection of the selected effect button; and
applying the video editing effect corresponding to the deselected effect button from the selected time point until selection of an end time point in the timeline of the displayed one video.

17. The system according to claim 16, further comprising a server communicably coupled to a plurality of user devices associated with a plurality of users, via a network.

18. The system according to claim 16, wherein the at least one processor is configured to detect a contact of a pointing device with the user interface as the detected touching, wherein the point device is one of: a finger, a mouse, a stylus, a pen.

* * * * *